Oct. 28, 1958   G. E. MEESE ET AL   2,858,467
VEHICLE HEADLAMP
Filed Dec. 8, 1954   3 Sheets-Sheet 1
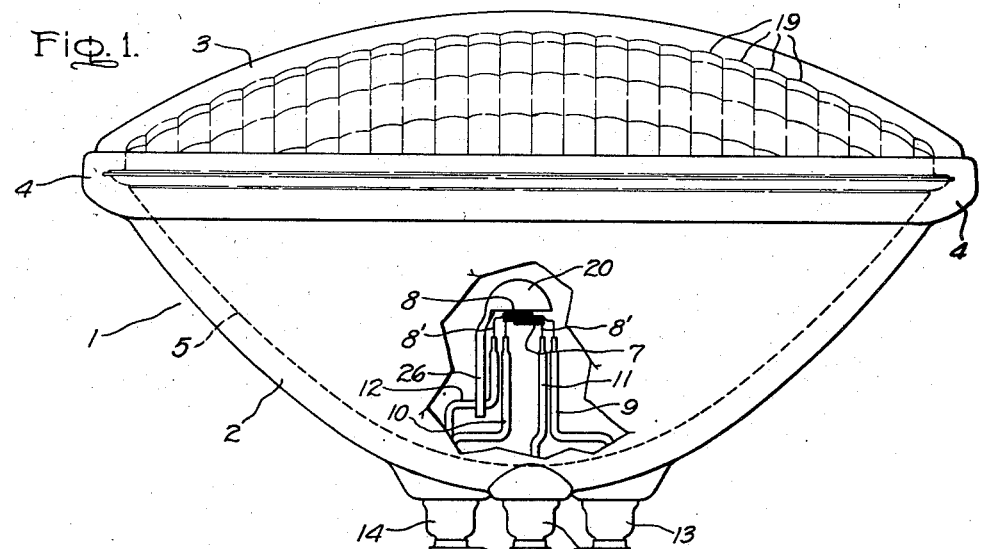
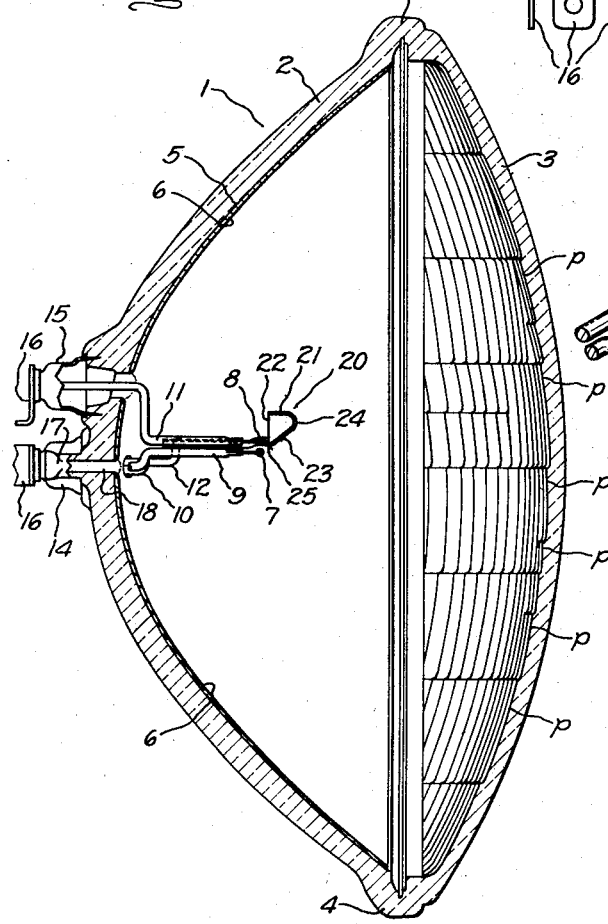
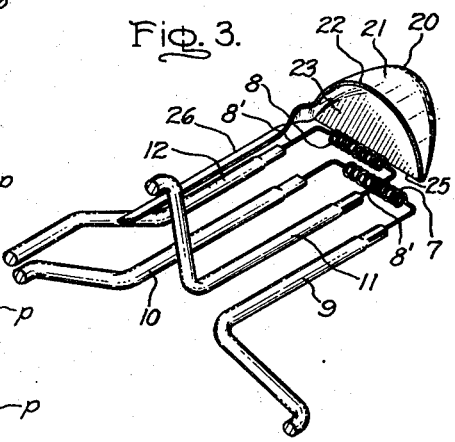
Inventors:
George E. Meese,
John O. Geissbuhler,
by Vernet C. Kauffman
Their Attorney.

Oct. 28, 1958 G. E. MEESE ET AL 2,858,467
VEHICLE HEADLAMP
Filed Dec. 8, 1954 3 Sheets-Sheet 3
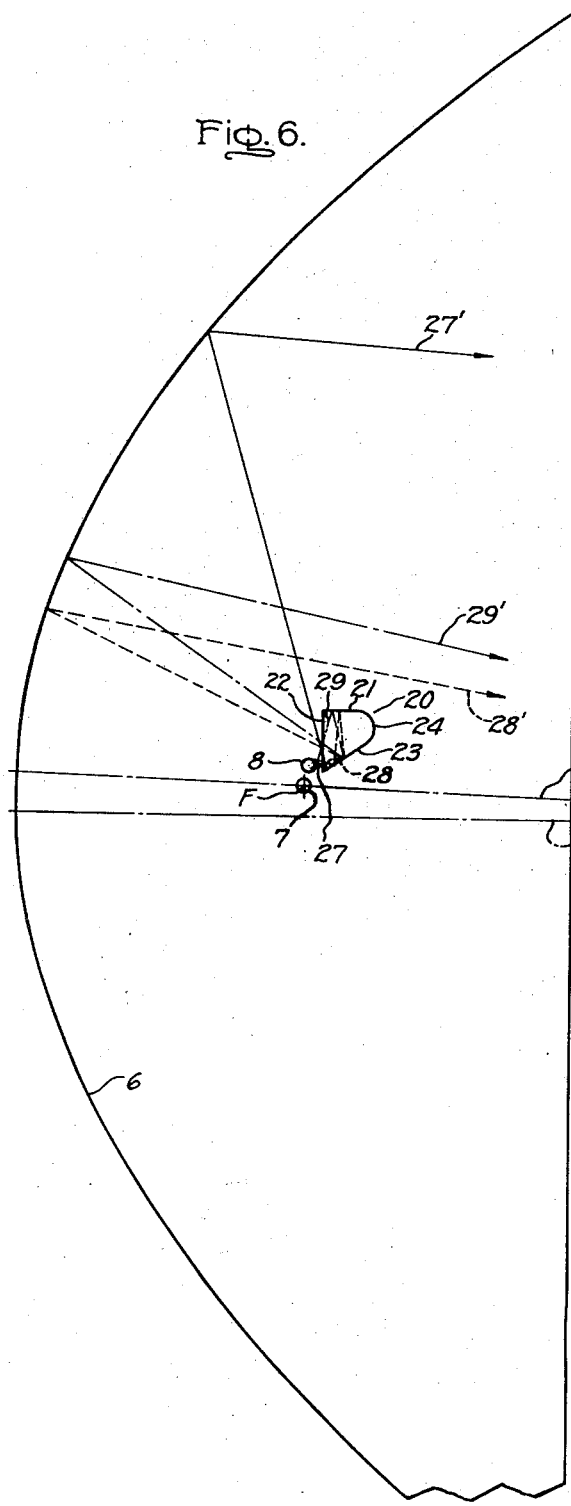
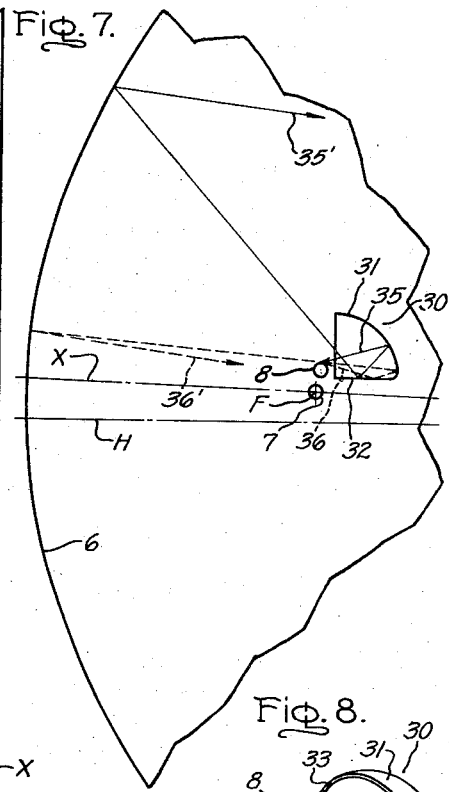
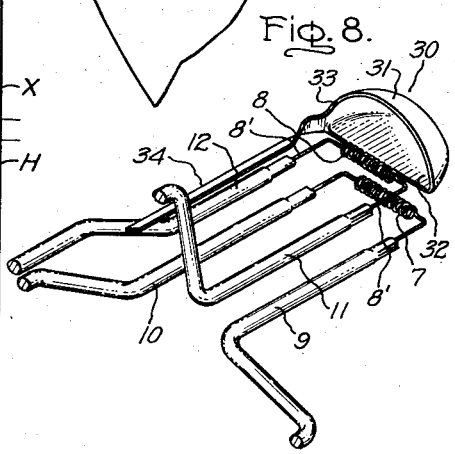
Inventors:
George E. Meese,
John O. Geissbuhler,
by Vernet C. Kauffman
Their Attorney.

United States Patent Office 2,858,467
Patented Oct. 28, 1958

2,858,467

VEHICLE HEADLAMP

George E. Meese, Lyndhurst, and John O. Geissbuhler, South Euclid, Ohio, assignors to General Electric Company, a corporation of New York Application December 8, 1954, Serial No. 473,797

11 Claims. (Cl. 313—115)

Our invention relates in general to vehicle headlamps, and more particularly to vehicle headlamps of the two filament type which are adapted to selectively produce either a high or road beam suitable for country driving purposes, or a low or depressed passing beam suitable for use when passing vehicles travelling in the opposite direction.

The conventional type vehicle headlight in general use at present on motor vehicles comprises, in combination, a concave reflector member of approximately paraboloidal shape mounted on the vehicle with its axis extending approximately horizontally, a pair of vertically spaced concentrated linear coil type filaments disposed horizontally within the reflector and transversely of its axis, one of the filaments (i. e. the major or road beam filament) being centered approximately at the focus of the reflector and the other filament (i. e. the minor or passing beam filament) being located slightly above and to one side of the major filament, and a light-refracting lens covering the mouth opening of the reflector member and provided with suitable light-reflecting media for re-directing the light rays from the reflector member so as to produce, upon selective energization of the filaments, either a high symmetrical road beam suitable for country driving purposes or a depressed asymmetric passing beam suitable for use when passing vehicles travelling in the opposite direction. Because of the particular character of the light-refracting media required on the lens, for such conventional type headlamps to produce road and passing beams meeting the specifications set therefor by the motor vehicle industry, an appreciable amount of upward spill light is unavoidably produced from the headlamp which becomes blinding when reflected to the eyes of the driver by fog, snow, rain or dust. This condition occurs with the depressed or passing beam as well as with the high or road beam. Moreover, with such conventional type vehicle headlamps, any increase in the wattage of the filaments, for the purpose of increasing the candlepower of the light beams and therefore the seeing distance of the motorist to a worthwhile degree, necessarily results in a corresponding increase in the glare from the headlamp to an extent such as becomes objectionable to the approaching motorist.

It is an object of our invention, therefore, to provide a vehicle headlamp of the two filament dual beam type which will produce an improved depressed passing beam which is substantially free of upward spill light.

Another object of our invention is to provide a vehicle headlamp of the dual beam type which will produce an improved depressed passing beam of materially increased intensity but having greatly reduced spill light and no significantly increased glare as compared to that produced by previous conventional headlamps of such general type.

Still another object of our invention is to provide an improved vehicle headlamp of the dual beam type which will produce a depressed passing beam which, while possessing approximately twice as much light near the top thereof as that produced by previous conventional type headlamps, is nevertheless characterized by reduced spill light and no significant increase in glare.

A further object of our invention is to provide a vehicle headlamp of the two-filament dual beam type which will produce a depressed beam which is not only satisfactory for passing purposes but which also possesses improved characteristics such as also renders the depressed beam particularly useful for driving in adverse weather conditions.

A still further object of our invention is to provide a vehicle headlamp of the two-filament dual beam type having a light-intercepting shield for the upper or passing beam filament which is so constructed as to not only intercept all the upward direct rays from the said filament which would normally pass directly out the upper half of the headlamp lens, but to also prevent the greater portion of such intercepted direct rays from being reflected by the shield back onto the headlamp reflector in a manner such as to be reflected thereby forwardly of the headlamp as upwardly inclined glare rays.

Another object of our invention is to provide an improved light-intercepting shield for vehicle headlamps which is constructed and configurated to control the reflections from the shield onto the headlamp reflector in a manner such as to prevent their reflection forwardly from the headlamp reflector in an upwardly inclined direction.

Briefly stated, in accordance with one aspect of our invention, a vehicle headlamp of the two-filament dual beam type is arranged to produce a depressed passing beam which is of the required characteristics and which is characterized by a minimum of upward spill and glare light and therefore eminently suited for driving in adverse weather conditions, by constructing the headlamp with a substantially paraboloidal reflector having its axis tilted downwardly at a slight angle of approximately 2° to the horizontal, employing in combination therewith a lens in which the number and the degree of down-bending prisms required to produce the passing beam are reduced a substantial amount over that required with a paraboloidal reflector having its axis horizontal, and providing further a light-intercepting shield in front of the minor filament constructed to not only intercept all the upwardly directed light from the minor filament in the solid angle subtended by the upper half of the headlight lens, but to also prevent the greater portion of such intercepted direct light from being reflected by the shield back down onto the lower region of the headlamp reflector where it would then be reflected forwardly and upwardly from the headlamp as glare rays.

Further objects and advantages of our invention will appear from the following detailed description of species thereof and from the accompanying drawings.

In the drawings,

Fig. 1 is a plan view of a vehicle headlamp comprising our invention, with a portion of the reflector thereof shown broken away to illustrate the internal construction of the headlamp.

Fig. 2 is a vertical axial section of the headlamp shown in Fig. 1.

Fig. 3 is a fragmentary perspective view of the filament mount and the associated light shield of the headlamp.

Fig. 6 is a diagrammatic illustration of the reflector of the headlamp of our invention, on a vertical axial plane thereof, together with the two filaments and the light shield of the headlamp, and showing the manner in which light rays from the upper or minor filament are intercepted and reflected by the light shield.

Fig. 7 is a diagrammatic illustration similar to Fig. 6 and showing a modified form of light shield according to the invention.

Fig. 8 is a fragmentary perspective view of the filament mount and associated modified light shield of Fig. 7.

Figure 4:
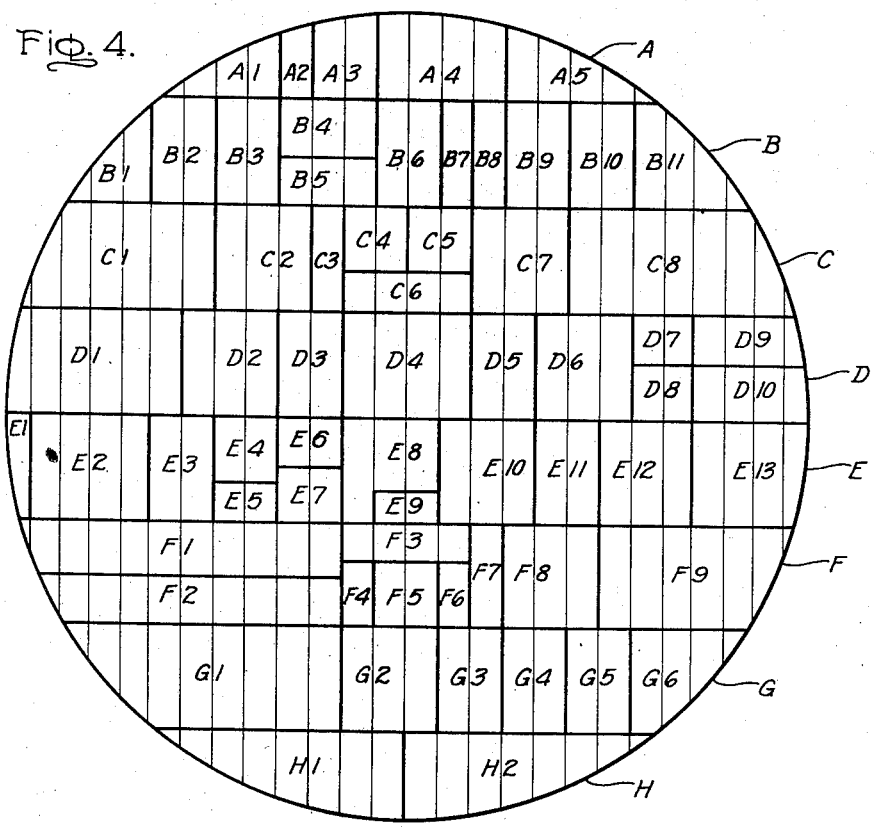
Fig. 4 is a front elevation of the lens of the headlamp comprising our invention.

Referring to Figs. 1 and 2, the invention is there shown as applied to a vehicle headlamp in the form of a self-contained incandescent lamp of the sealed beam type such as described and claimed in United States Patent Nos. 2,148,314 and 2,148,315 issued Febuary 21, 1939 to D. K. Wright. The lamp comprises a sealed bulb or envelope 1 consisting of a pressed glass reflector section 2 and a cover glass or light-modifying lens section 3 sealed together at their peripheries by fusion, as indicated at 4. The inner surface 5 of the reflector section 2 is shaped to conform approximately to a paraboloid which, in accordance with the invention, is formed with its axis X (Fig. 6) tilted or off-set slightly downward and forwardly, relative to the horizontal axis H of the lamp envelope 1, at an angle of from one to a few degrees, for example, one to four degrees, and preferably of the order of two degrees. The inner surface 5 of the reflector section is provided with a coating 6 of suitable reflecting material, such as aluminum or silver, to thereby form a reflecting surface.

A pair of concentrated light sources, comprising a major or upper beam filament 7 and a minor or lower beam filament 8, are mounted in the envelope 1 in the vicinity of the focal point of the reflecting surface 6. The filaments 7 and 8 preferably each comprise a linear coil of a suitable refractory metal such as tungsten, and they are spaced one above the other in the envelope 1 in horizontally-extending parallel relation transversely of the reflector axis X with the major filament 7 symmetrically located approximately at the focal point of the reflecting surface 6 and the minor filament 8 located a slight distance of, for example, 0.085 inch, on centers, above the major filament 7 and approximately in the focal plane of the reflecting surface 6, and offset a slight distance of, for example 0.090 inch, on centers, to the right of the major filament 7, as viewed from the front or lens 3 of the lamp. The filaments 7 and 8 are electrically connected to and are supported in place within the lamp envelope by respective pairs of rigid lead-in wires 9, 10 and 11, 12 which extend through openings in the wall of the reflector section 2 at the rear thereof and are secured at their outermost ends, as by brazing, for instance, to metal thimbles or ferrules 13, 14 and 15, having feathered edges embedded in and fusion sealed to the exterior of the reflector section 2 around the said openings. Metal contact or terminal lugs 16 are suitably secured, as by brazing, to the closed ends of the thimbles 13, 14 and 15 for connecting the lamp to a suitable source of current supply. The thimbles 13, 14 and 15 are preferably arranged in a symmetrical triangular manner on the rear side of the reflector section 2, with each thimble located approximately the same distance from the reflector axis X and with two of the thimbles, i. e., thimbles 13 and 14, disposed in an axial plane of the reflector section and the other or third thimble 15 located above the two thimbles 13 and 14 when the lamp is mounted in place on a vehicle. The two lead-in wires 9, 10 for the major filament 7 are connected to the two side thimbles 13 and 14, respectively, while the two lead-in wires 11 and 12 for the minor filament 8 are connected to the top thimble 15 and to one of the side thimbles (thimble 14), respectively. The lamp envelope 1 is exhausted and, if desired, filled with a suitable inert gas such as argon, nitrogen or mixtures thereof, through an exhaust tubulation 17 communicating with the interior of the envelope through an exhaust aperture 18 in the envelope wall at the apex of the reflector section 2. After exhaustion of the lamp envelope through the tubulation 17 and, if desired, introduction of the gas filling thereinto, the tubulation 17 is sealed or tipped-off to hermetically seal the lamp envelope.

The light-modifying lens 3 of the headlamp is provided with suitable light-refracting media, preferably on the inner side of the lens, for refracting the rays of light from the reflecting surface 6 so as to produce, upon selective energization of the filaments 7 and 8, upper driving and lower passing beams conforming to the specifications set therefor by the motor vehicle industry. For this purpose, the lens 3 is preferably divided into a series of horizontally extending sections consisting of an upper top section A, a lower top section B, an upper intermediate section C, an upper central section D, a lower central section E, a lower intermediate section F, an upper bottom section G, and a lower bottom section H. Each of the sections A—F is provided, across the full width thereof, with a plurality of small (approximately ¼ inch wide) vertically extending light-spreading flutes 19, preferably disposed in side-by-side relation on the rear or inside surface of the lens as shown in Fig. 1, for horizontally spreading the light passing through the flutes. Certain of the flutes 19 in each section A—F are of different degrees of spread in order to impart the required horizontal spread to the beams projected by the lamp. In addition, certain portions of each of said sections A—F are formed with either upwardly, downwardly, left or right bending prisms to provide the required vertical and horizontal distribution of the light in the beams projected by the lamp.

In the manufacture of lenses formed with light bending prisms thereon, the ends or extremities of said prisms must be provided with a slight amount of draft in order to permit separation of the lens from the pressing plunger of the molding apparatus. The bases of the prisms always have rounded corners which constitute small secondary lenses which direct the rays of light striking the same in a direction opposite to that of the rays refracted by the prism itself.

With the conventional type headlamps presently in use employing an approximately paraboloidal reflector having its axis extending horizontally, it has been necessary to provide the lens with down-bending prisms over most (e. g. as high as 95%) of the surface area of the lens in order to direct the rays of light passing therethrough downward so as not to strike the eyes of approaching motorists, and to produce upper driving and lower passing beams meeting the requirements set therefor. The previously described corners of such down-bending prisms, as well as the flat base surfaces thereof, direct the rays of light striking them upward from the headlamp. Thus these corners and base surfaces of the down-bending prisms constitute sources of light in the lens itself which create a considerable amount of upward spill and glare light which, when added to the upward direct light from the filament, creates an upwardly directed curtain of spill and glare light from the headlamp which becomes blinding when reflected back into the eyes of the driver by fog, mist, rain, snow or dust.

In accordance with the invention, by using a paraboloidal reflecting surface 6 having its axis tilted downwardly at a slight angle of from one to a few degrees, and preferably of the order of two degrees as described hereinabove, a lens 3 having only a small proportion (e. g. 25% or so) of its total surface area provided with down-bending prisms, and in which the greater proportion of the lens surface area is provided instead with up-bending prisms, can be constructed to produce driving and passing beams meeting the required specifications therefor. In addition, the bending power of those comparatively few down-bending prisms which, of necessity, must still be employed in such a lens in order to produce the required driving and passing beams from the headlamp, is of a considerably smaller degree than that which would be required with a conventional horizontally-aimed paraboloidal reflecting surface 6. As a result, the bases or draft surfaces of such smaller degree down-bending prisms are of appreciably shorter depth or size, thus effecting a corresponding substantial reduction in the amount of upward spill and glare light produced by such prism draft surfaces. Moreover, because of the reduction in the number of down-bending prisms required on the lens 3, most of such down-bending prisms are therefore located immediately above and contiguous to upbending prisms which are, for the most part, of equal or greater refractive power than the down-bending prisms, thus either entirely eliminating the base or draft surfaces between such adjacent vertical prisms or actually resulting in small base or draft surfaces on the up-bending prisms which, as pointed out hereinafter, do not produce upward spill and glare light. The sum result, therefore, of this substantial reduction both in the number and in the degree of down-bending prisms required in the lens 3 is to reduce the number of glare-producing prism base surfaces, and therefore the glare rays and upward spill light from the lens itself, to an insignificant amount.

Figure 5:
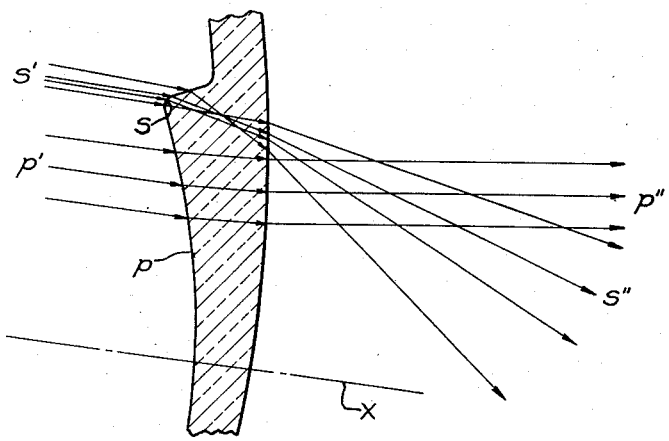
Fig. 5 is an enlarged view of one of the vertical upward bending prisms formed on the rear surface of the lens, showing the manner in which the rays of light striking the various portions of the same are refracted thereby.

The rays of light striking the draft surfaces and rounded corners of the up-bending prisms on the lens 3 are not refracted upwardly from the headlamp so as to produce upward spill or glare light. Thus, referring to Fig. 5, showing an enlarged view of one of the up-bending vertical prisms $p$ formed on the rear surface of the lens 3, the projected rays of light $p'$ striking the prism itself are refracted upwardly, as at $p''$, while the projected rays of light $s'$ which strike the prism base corner $s$ are directed downwardly as indicated at $s''$. Thus there are practically no upwardly directed rays of light emanating from the prism base corners or the prism base surfaces which would be apt to strike the eyes of approaching drivers or produce an upward curtain of spill light. By simply aiming the reflector axis X at a downward angle below the horizontal plane passing through the reflector focal point, and selecting the proper degree of refractive power for the up-bending prisms, the rays of light $p''$ refracted by the up-bending prisms $p$ on the lens can be made to project in the desired manner down the roadway up to the horizontal or slightly thereabove.

While there are many different arrangements of light-refracting flutes and prisms on the lens 3 that may be employed in association with the downwardly tilted reflector 6 to produce driving and passing beams meeting the required specifications set therefor, the following approximate prescription has been found to be particularly effective:

| Area | Horizontal Spread, degrees | Upward Bending, degrees | Downward Bending, degrees | Right Bending, degrees | Left Bending, degrees |
|---|---|---|---|---|---|
| A1 | 18 | | 1 | | |
| A2 | 1 | ½ | | | ¼ |
| A3 | 1 | | 1 | | |
| A4 | 2 | | | | |
| A5 | 36 | | 2½ | | |
| B1 | 18 | 1 | | | |
| B2 | 4 | 1½ | | | |
| B3 | 4 | 1¾ | | | |
| B4 | 1 | 1¼ | | | ½ |
| B5 | 1 | 1¾ | | | ½ |
| B6 | 1 | ¾ | | ¼ | |
| B7 | 2 | 1 | | | |
| B8 | 18 | | 1¼ | | |
| B9 | 36 | | 1¼ | | |
| B10 | 1 | | ½ | 1 | |
| B11 | 36 | | 1¼ | | |
| C1 | 32 | 1¾ | | | |
| C2 | 24 | 2 | | | |
| C3 | 36 | 1½ | | | |
| C4 | 1 | 1½ | | | ¼ |
| C5 | 1 | 1½ | | ¼ | |
| C6 | 40 | 1½ | | | |
| C7 | 15 | | | | |
| C8 | 28 | | | | |
| D1 | 1 | 1¾ | | | |
| D2 | 15 | 3 | | 3 | |
| D3 | 18 | 2½ | | | |
| D4 | 40 | 1 | | | |
| D5 | 18 | 2 | | | |
| D6 | 40 | 1¾ | | | |
| D7 | 2 | 1¼ | | ¼ | |
| D8 | 2 | 1¾ | | ¼ | |
| D9 | 15 | ¼ | | | |
| D10 | 4 | 2¼ | | | |
| E1 | 18 | 1 | | | |
| E2 | 2 | 2 | | | |
| E3 | 2 | 2½ | | 1¾ | |
| E4 | 8 | 1¾ | | ½ | |
| E5 | 8 | 1 | | 1½ | |
| E6 | 18 | | ½ | 1½ | |
| E7 | 1 | 1½ | | | ¼ |
| E8 | 18 | 2½ | | | |
| E9 | 8 | 5 | | 1 | |
| E10 | 18 | 2¾ | | | |
| E11 | 40 | 2 | | | |
| E12 | 8 | 2 | | | |
| E13 | 3 | 2 | | | |
| F1 | 28 | ½ | | | |
| F2 | 28 | | ½ | | |
| F3 | 18 | 1½ | | | |
| F4 | 1 | 2 | | ½ | |
| F5 | 1 | 2 | | | ¼ |
| F6 | 1 | 2 | | | ¾ |
| F7 | 32 | 1½ | | | |
| F8 | 36 | 1¾ | | | |
| F9 | 32 | 2½ | | | |
| G1 | 32 | | ½ | | |
| G2 | 2 | 2 | | | |
| G3 | 2 | 1¾ | | | |
| G4 | 3 | 2 | | | |
| G5 | 3 | 2 | | | ¼ |
| G6 | 36 | 1½ | | | |
| H1 | 32 | | 1 | | |
| H2 | 32 | | ½ | | |

In the lens according to the above description, only about 25% of the total surface area thereof is provided with down-bending, and therefore glare-producing prisms. Also, in the above lens prescription, it will be observed that the top and bottom and the upper right and lower left areas in general of the lens are provided with down-bending prisms, and for the most part with wide-spreading flutes, for directing the light rays passing through such areas downwardly to form the lower portions of the light beams produced by the headlamps.

While the use of a paraboloidal reflecting surface 6 with its axis tilted slightly downward, in combination with a lens 3 having a greatly decreased number and degree of down-bending prisms, of itself accounts for a substantial reduction in the upward glare and spill light from the headlamp, a further considerable reduction in such upward glare and spill light is effected, in accordance with the invention, by the shielding of the minor filament with a concave controlled-reflectance shield 20 which is constructed not only to intercept all the direct rays from the minor filament which would otherwise pass out the upper half of the lens 3, but also to shield a substantial part of the lower half of the reflecting surface 6 from the light-intercepting surface of said shield and prevent the light rays intercepted by the shield from being reflected thereby back onto the reflecting surface 6 in a manner such as to cause them to be reflected forwardly and upwardly from the headlamp as glare rays. To this end, the shield 20 is also configurated and positioned relative to the minor filament 8 so as to confine the reflections from the shield back onto the reflecting surface 6 of the headlamp, to paths passing through the focal plane of the reflecting surface 6 at points above the focal point of the said reflecting surface. The shield 20 comprises a concave member, preferably in the form of a sheet metal stamping, disposed a slight distance ahead of the minor filament 8, with its concave inner side facing the said minor filament and preferably of low reflective character. The shield 20 may be conveniently formed of thin, cold-rolled steel, for instance, having a thickness of around .015 to .017 inch, for example.

In one form, the shield 20 may comprise a concavely curved upper wall portion 21 the rear edge 22 of which is of approximately semi-circular shape, and a more or less flat bottom wall or underside portion 23 which closes off and to a great extent shields the concave upper wall portion 21 from the lower half of the reflecting surface 6.

In the case of one preferred form of shield 20, shown in Figs. 2–3, the upper wall portion 21 of the shield is in the shape of a semi-cylindrical surface having a diameter appreciably greater than, for example, of the order of twice the effective length of the minor filament 8 and positioned with its concave inner side facing downwardly and with its axis extending approximately parallel to the horizontal axis H of the lamp and lying within a vertical plane passing through approximately the center of the minor filament 8 so as to locate the semi-cylindrical top wall 21 in the medial plane of the minor filament. The bottom wall portion 23 of the shield 20 in Figs. 2–3 extends between and joins the side extremities of the semi-cylindrical top wall portion 21, and it extends upwardly and forwardly from the rear edge 22 of the top wall portion at an angle of, for example, from 30° to 45° (preferably around 35°) to the horizontal, to intersect the semi-cylindrical top wall portion 21 in a rounded front corner portion 24. The rear edge 25 of the bottom wall portion 23 of the shield preferably constitutes a continuation of the rear edge 22 of the top wall portion 21 so as to be coplanar therewith, and it is disposed horizontally and parallel with the minor filament 8 as close as practical thereto and at a level even with or slightly below the lowermost side of the minor fiament 8 so as to cut off the forward light therefrom down to the horizontal. In the particular case illustrated, wherein the semi-cylindrical top wall portion 21 of the shield 20 has a radius of around ¼ inch or so and the minor filament 8 has an effective length between the end legs 8' thereof of around 5⁄16 inch, the plane of the rear edges 22 and 25 of the shield is located approximately .050 inch forwardly of the minor filament 8, measured from the axis of the latter.

The shield 20 may be supported in place in the lamp in any suitable manner, as by a rearwardly extending strap or leg 26 formed integral with the shield or as a separate member fastened thereon, and suitably fastened to one of the lead-in wires 12, as by welding, for instance. Preferably, however, the shield 20 is supported in place in the manner described and claimed in co-pending application Serial No. 473,796, Flaws et al., filed of even date herewith and assigned to the same assignee as the present invention.

Fig. 6 illustrates the manner in which light rays from the minor filament 8 are intercepted by the shield 20 and prevented from being reflected thereby back onto the reflecting surface 6 in a manner to cause them to be reflected therefrom in a forward and upwardly-inclined direction. In this connection, it should be understood that while the inside surfaces of the shield 20 are of low reflectance character, a certain amount of the light from the minor filament 8 striking the shield is nevertheless reflected by the inside surfaces thereof, and that while these reflections are scattered or diffused to a certain degree because of the low-reflective character of the inside surfaces of the shield, a good proportion of the incident light striking the shield is actually reflected therefrom at angles approximately corresponding to the angle of incidence. Accordingly, rays of light 27 from the minor filament 8 striking the bottom wall portion 23 of the shield near the rear edge 25 thereof are, in general, reflected by the bottom wall 23 upwardly and at a slightly rearward inclination onto the upper half of the reflecting surface 6 where they are then reflected forwardly as downwardly inclined rays 27'. Rays of light 28 from the minor filament 8 striking the bottom wall portion 23 of the shield further inwardly thereof from its rear edge 25 are, in general, reflected by the bottom wall 23 upwardly onto the upper wall portion 21 of the shield and thence back down onto the bottom wall portion 23 again where they are then reflected upwardly and rearwardly onto the upper half of the reflecting surface 6 and thence forwardly from the headlamp as downwardly inclined rays 28'. Rays of light 29 from the minor filament 8 striking the upper wall portion 21 of the shield are, in general, reflected thereby down onto the lower wall portion 23 of the shield where they are then reflected rearwardly and upwardly onto the upper half of the reflecting surface 6 and thence forwardly therefrom as downwardly inclined rays 29'. Thus, the forward and upward direct rays of light from the minor filament 8 are intercepted by the shield 20 and for the most part are either trapped therewithin or are reflected therefrom through one or more reflections within the shield, back onto the reflecting surface 6, in paths passing through the focal plane of the reflecting surface 6 above the focal point F of the said reflecting surface, where they are then reflected forwardly from the headlamp as downwardly inclined rays. Being downwardly inclined, these reflected rays of light from the shield 20 therefore do not produce any upward spill or glare light from the headlamp. In the operation of the shield 20 to achieve the above described result, the bottom wall portion 23 of the shield acts as a barrier or secondary shield serving to block the rays of direct light from the minor filament intercepted by and striking the concave upper portions 21 and 24 of the shield from being reflected thereby back down onto the lower half of the reflecting surface 6 where they would then be reflected forwardly and upwardly from the headlamp as upward spill or glare light.

Figs. 7 and 8 illustrate a modified form of shield 30 according to the invention for intercepting the upward direct rays of light from the minor filament 8 and redirecting such intercepted light rays in such a manner within the headlamp as not to produce upward spill or glare light therefrom. The modified shield 30, which may be made of the same material as the shield 20, is composed of a lune-shaped upper wall portion 31 preferably in the form of a quadrant of a hollow sphere having a diameter appreciably greater than (e. g. of the order of twice as great as) the effective length of the minor filament 8 and a more or less flat bottom wall portion 32 which closes off and to a great extent shields the concave upper wall portion 31 from the lower half of the reflecting surface 6, in the same manner as the bottom wall 23 of the shield 20 in Figs. 2 and 3. The shield 30 is positioned a slight distance ahead of the minor filament 8, in the same way as the shield 20 of Figs. 2 and 3, with the semi-circular rear edge 33 of the upper wall portion 31 of the shield disposed approximately in a vertical plane transverse to the lamp axis H and the bottom wall 32 disposed approximately in a horizontal plane level with or slightly below the lowermost side of the minor filament 8, in order to intercept and cut off all the forward direct light therefrom down to the horizontal. Like the shield 20 of Figs. 2 and 3, the modified shield 30 in Figs. 7 and 8 is disposed in the medial plane of the minor filament 8 so as to be centered in front thereof. The shield 30 may be supported in place in the lamp in any suitable manner, as by a rearwardly extending strap or leg 34 formed integral with the shield or as a separate member fastened thereon, and suitably fastened to one of the lead-in wires 12 as by welding, for instance.

Referring to Fig. 7, illustrating the manner in which rays of direct light from the minor filament 8 are intercepted and, in general, reflected by the modified shield 30, it will be seen that rays of light 35 from the minor filament striking the spherically shaped upper wall portion 31 of the shield near the front end thereof are reflected by the said upper wall portion 31 back down onto the horizontally disposed bottom wall portion 32 of the shield where they are then reflected backwardly and upwardly onto the upper half of the reflecting surface 6 and thence forwardly from the headlamp as downwardly inclined rays 35'. Rays of light 36 from the minor filament striking the lower wall 32 of the shield 30 are, in general, reflected onto the upper wall 31 of the shield and thence rearwardly onto the upper half of the reflecting surface 6 where they are then reflected forwardly of the headlamp as downwardly inclined rays 36'. Thus, it will be seen that the forward and upward direct rays of light from the minor filament 8 are intercepted by the shield 30 and, as in the case of the shield 20 of Figs. 2 and 3, are for the most part either trapped within the shield 30 or are reflected therefrom through one or more reflections within the shield, back onto the reflecting surface 6 in a manner (i. e., in paths passing through the focal plane of the reflecting surface at points above the reflector focal point F) such as to cause their reflection from the reflecting surface 6 to be directed forwardly from the headlamp in a downwardly inclined direction. As a result, the reflected rays of light from the shield 30 do not produce any significant upward spill or glare light from the headlamp.

By the use, in accordance with the invention, of a paraboloidal reflecting surface 6 with its axis inclined downwardly at a slight angle, of the order of two degrees for example, in conjunction with a lens 3 having a preponderance of its surface area devoid of downbending prisms and their corresponding draft surfaces and provided instead either with up-bending vertical prisms or with no vertical prisms at all, along with a controlled reflectance light-intercepting shield for the minor filament 8 of the general character disclosed herein and constructed so that reflections from the shield back onto the paraboloidal reflecting surface 6 are directed in such a manner thereonto as to be reflected forwardly from the headlamp as downwardly inclined light rays, a vehicle head lamp is produced which not only provides upper driving and depressed passing beams conforming to the required specifications therefor but which also provides a depressed passing beam which is free of upward spill or glare light to a degree such as renders the passing beam almost as effective for driving in fog or adverse weather conditions as a conventional fog lamp specifically designed for such purpose. Moreover, as a result of the marked reduction in the upward spill light from the headlamp of our invention, the wattage rating of the two filaments 7 and 8 can be materially increased over that heretofore conventionally employed, thereby to provide greatly increased beam candlepower and visibility distance down the road, without creating any significant increase in glare or as much upward spill light as that produced by conventional vehicle headlamps in use at present. Thus, we have found that the present conventional wattage ratings of 45 and 35 watts, respectively, for the major and minor filaments 7 and 8 can be increased to 50 and 40 watts, respectively, in our improved vehicle headlamp without causing any appreciable increase in glare light and at the same time resulting in a major reduction in upward spill light from the headlamp over that produced by conventional type vehicle headlamps presently in use. In addition, a vehicle headlamp according to the invention provided with such higher wattage filaments 7 and 8 and with a lens of the general character set forth hereinabove will produce a depressed passing beam which, while possessing approximately twice as much light near the top thereof as that produced by previous conventional type headlamps, is nevertheless characterized by greatly reduced spill light and no significant increase in glare.

While our invention is shown and described as applied to an all-glass sealed-beam type of vehicle headlamp, it should be understood that it is not limited thereto but is applicable as well to other types of vehicle headlamps such as, for instance, those employing separate lens and reflector members and a separate incandescent lamp mounted within the reflector. Also, while the filaments 7 and 8 are shown and described as being in the form of linear coils, they may be of other forms as well, such as arcuate or V-shaped coils, for instance. In addition, the bottom wall portion 23 or 32 of the shield may be of slightly curved or bowed form instead of flat as shown.

What we claim as new and desire to secure by Letters Patent of the United States is:

1. A vehicle headlamp comprising an approximately paraboloidal reflector adapted for mounting on the vehicle with the axis of the reflector tilted downwardly at an angle of from approximately one to a few degrees to the horizontal, a major coil filament disposed approximately horizontally and transversely of the axis of said reflector approximately at the focus thereof, a minor coil filament extending parallel to and spaced a slight distance above said major filament and offset a slight distance to one side of the vertical axial plane of said reflector, a lens covering the mouth of said reflector and provided with light-refracting media including vertical up-bending and down-bending prisms on its surface for refracting the light rays reflected by said reflector, upon selective energization of said filaments, into respective beams of the desired characteristics, the said down-bending prisms being provided on only a small proportion of the total surface area of said lens, and a dished light-intercepting shield mounted in front of and closely adjacent said minor filament and intercepting substantially only those direct rays therefrom in the solid angle subtended by the upper half of said lens, said shield having a configuration confining reflections therefrom of the intercepted direct rays from the minor filament substantially to paths passing through the focal plane of said reflector at points located above the focal point of said reflector.

2. A vehicle headlamp as defined in claim 1 wherein the said shield comprises a concave upper wall portion positioned with its concave side facing downwardly toward the said minor filament, and an approximately flat lower wall portion underlying and shielding the concave underside of said upper wall portion from the lower portion of said reflector, said lower wall portion of the shield having its rear edge extending generally parallel to said minor filament coil and located closely adjacent and at an elevation no higher than said minor filament coil.

3. A vehicle headlamp as defined in claim 1 wherein the said shield comprises a concave upper wall portion essentially of semi-cylindrical shape positioned with its concave side facing downwardly and with its axis extending approximately parallel to the horizontal axis of said headlamp, and an approximately flat lower wall portion underlying and shielding the concave underside of said upper wall portion from the lower portion of said reflector, said lower wall portion extending upwardly and forwardly of the head lamp at an angle to the horizontal and having its rear edge extending generally parallel to said minor filament coil and located closely adjacent and at an elevation no higher than the lowermost side of said minor filament coil.

4. A vehicle headlamp as defined in claim 1 wherein the said shield comprises a concave upper wall portion of approximately quarter-spherical shape and positioned forwardly of and above the said minor filament with its concave side facing said minor filament and with one edge thereof disposed approximately in a vertical plane located slightly ahead of the minor filament, and an approximately flat lower wall portion disposed approximately horizontal and at an elevation no higher than the lowermost side of said minor filament coil, with its rear edge located closely adjacent said minor filament coil.

5. In combination with a vehicle headlamp comprising a concave reflector adapted for mounting on the vehicle with the reflector facing horizontally, a light-modifying lens covering the mouth of said reflector, and a concentrated light source disposed adjacent the focus of said reflector, a dished light-intercepting shield mounted in front of and closely adjacent said light source to intercept the direct rays therefrom in the solid angle subtended by the upper half of said lens, said shield comprising a concave upper wall portion, positioned with its concave side facing downwardly, and an approximately flat lower wall portion underlying and shielding the concave underside of said upper wall portion from the lower portion of said reflector, said lower wall portion of the shield having its rear edge extending approximately horizontally and transversely to the axis of said headlamp and located closely adjacent and at an elevation no higher than said light source.

6. In combination with a vehicle headlamp comprising a concave reflector adapted for mounting on the vehicle with the reflector facing horizontally, a light-modifying lens covering the mouth of said reflector, and a concentrated linear coil filament located adjacent the focus of and disposed horizontally and transverse to the axis of the said reflector, a dished light-intercepting shield mounted in front of and closely adjacent said filament to intercept the direct rays therefrom in the solid angle subtended by the upper half of said lens, said shield comprising an approximately semi-cylindrical upper wall portion, positioned with its concave side facing downwardly and with its axis extending approximately parallel to the horizontal axis of said headlamp, and an approximately flat lower wall portion underlying and shielding the concave underside portion of said upper wall portion from the lower portion of said reflector, said lower wall portion extending upwardly and forwardly of the headlamp at an angle to the horizontal and having its rear edge extending generally parallel to said filament coil and located closely adjacent and at an elevation no higher than the lowermost side of the said filament coil.

7. In combination with a vehicle headlamp comprising a concave reflector adapted for mounting on the vehicle with the reflector facing horizontally, a light-modifying lens covering the mouth of said reflector, and a concentrated linear coil filament located adjacent the focus of and disposed horizontally and transverse to the axis of said reflector, a dished light-intercepting shield mounted in front of and closely adjacent said filament coil to intercept the direct rays therefrom in the solid angle subtended by the upper half of said lens, said shield comprising a concave upper wall portion of approximately quarter-spherical shape and positioned with one edge thereof disposed approximately in a vertical plane located slightly ahead of said filament coil, and an approximately flat lower wall portion disposed approximately horizontal and at an elevation no higher than the horizontal plane of the lowermost side of said filament coil, with its rear edge located closely adjacent said filament coil.

8. A shield for mounting in a vehicle headlamp forwardly of and above a filament therein for intercepting glare-producing direct radiations therefrom directed forwardly and upwardly from the headlamp, comprising a deeply dished sheet metal member of generally concave form when viewed in position from the filament and having a generally concave upper wall portion having its concave side facing downwardly and an approximately flat lower wall portion underlying and contiguous to and closing off the said concave upper wall portion so as to intercept radiations reflected downwardly therefrom.

9. A shield for mounting in a vehicle headlamp forwardly of and above a filament therein for intercepting glare-producing direct radiations therefrom directed forwardly and upwardly from the headlamp, comprising a dished sheet metal member of generally concave form when viewed in position from the filament and having a generally semi-cylindrical upper wall portion having its concave side facing downwardly and an approximately flat lower wall portion slanting upwardly and forwardly into said upper wall portion so as to intercept radiations reflected downwardly therefrom.

10. A shield as defined in claim 9 wherein the said lower wall portion of the shield is slanted upwardly and forwardly at an angle of the order of 35° to the horizontal and the rear edges of both the upper and lower wall portions of the shield are disposed approximately in a common plane extending transversely to the axis of the semi-cylindrical upper wall portion.

11. A shield for mounting in a vehicle headlamp forwardly of and above a filament therein for intercepting glare-producing direct radiation therefrom directed forwardly and upwardly from the headlamp, comprising a dished sheet metal member of generally concave form when viewed in position from the filament and having a concave upper wall portion of approximately quarter-spherical shape having its concave side facing downwardly toward the filament and an approximately flat lower wall portion underlying and closing off the said concave upper wall portion so as to intercept radiations reflected downwardly therefrom.

References Cited in the file of this patent
UNITED STATES PATENTS

| 1,451,161 | Helm | Apr. 10, 1923 |
|---|---|---|
| 1,693,672 | Schroeder | Dec. 4, 1928 |
| 1,793,398 | Hamberger | Feb. 17, 1931 |
| 2,148,315 | Wright | Feb. 21, 1939 |
| 2,617,062 | Rijnders | Nov. 4, 1952 |